United States Patent [19]

Truss

[11] Patent Number: 4,480,415
[45] Date of Patent: Nov. 6, 1984

[54] EXTENDABLE STRUCTURES

[75] Inventor: Peter Truss, Bristol, England

[73] Assignee: British Aerospace Public Limited Company, London, England

[21] Appl. No.: 389,488

[22] Filed: Jun. 17, 1982

[30] Foreign Application Priority Data

Jun. 19, 1981 [GB] United Kingdom ............... 8119040

[51] Int. Cl.³ .............................. E04H 12/18
[52] U.S. Cl. ...................... 52/108; 52/121; 52/632; 52/645; 244/159
[58] Field of Search ............... 52/108, 115, 121, 632, 52/645, 646; 244/159, 173

[56] References Cited

U.S. PATENT DOCUMENTS

| 3,593,481 | 7/1971 | Mikulin | 52/632 |
| 3,611,652 | 10/1971 | Rabenhorst | 52/121 |
| 3,751,863 | 8/1973 | Lyons | 52/632 |
| 4,446,662 | 5/1984 | Humphries | 52/121 |

FOREIGN PATENT DOCUMENTS

| 2487133 | 1/1982 | France | 244/159 |
| 2063959 | 6/1981 | United Kingdom | 52/645 |
| 2074981 | 11/1981 | United Kingdom | 52/121 |

Primary Examiner—John E. Murtagh
Assistant Examiner—K. Ford
Attorney, Agent, or Firm—Cushman, Darby & Cushman

[57] ABSTRACT

An extendable open frame boom structure 10 includes three longerons 11 which when the boom is extended lie in spaced parallel relationship to define three planes, A, B, C and a series of frame elements 12, arranged at intervals along the length of the boom interconnecting the longerons. Between each pair of adjacent frame elements 12, each longeron comprises a pair of foldable rod members 13, hinged at each end to a frame element. The hinges are arranged so that on movement to a stowed condition, each pair of rod members moves within one of the three planes, A, B or C. A boom system is also disclosed which includes a boom structure 10, housing 18 and a drive mechanism for moving the frame elements 12 one after another between stowed and elongate conditions.

11 Claims, 5 Drawing Figures

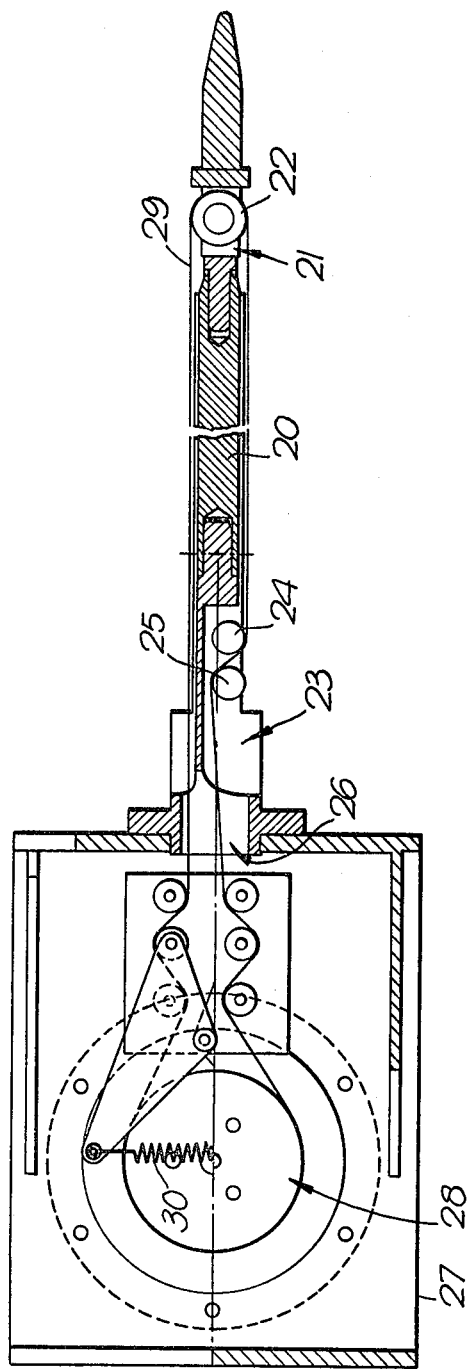

EXTENDABLE STRUCTURES

This invention relates to extendable structures adapted to be moved between a stowed, collapsed, condition and an elongated, deployed, condition. In particular, but not exclusively, this invention relates to deployable truss structures for use in space applications, e.g. lightweight lattice structures for use in constructing orbital platforms.

According to one aspect of this invention, there is provided an open-frame boom structure movable between a stowed compact condition and an elongate extended condition including at least three longeron means which, when the boom is in its extended condition, extend substantially along the length of the boom spaced one from the other to define at least three planes, a series of rigid frame elements arranged substantially parallel one to another, transverse to the length of the boom at intervals therealong and interconnecting the longeron means, the portion of each longeron means between adjacent frame elements being defined by at least two elongate members each hinged at one end to a frame element and at the other end to the other elongate member respectively, the respective hinges being arranged such that on movement between said deployed and stowed conditions the elongate members hingedly move within one of said planes and also such that the frame element moves axially with respect to the length of the boom without rotation, there being locking means releasably to lock each pair of elongate members in a straight, co-axial condition.

In this arrangement, the elongate members hinge in a plane spaced from the longitudinal axis of the boom; this greatly reduces any tendency for bending loads on the extended boom causing the elongate members inadvertently to hinge thereby collapsing the boom. In addition, it allows the central volume defined by the three planes to be used for additional equipment, for example drive means. Each of said elongate members is preferably of substantially the same length as a side of the associated frame elements, in which case the spacing between adjacent frame elements when extended is approximately twice the length of a side of a frame element. The locking means conveniently comprise an over-centre spring arrangement, so that they "flip" into a straight configuration.

In another aspect of this invention, there is provided a deployable open-frame boom system including the boom structure as previously described and further including housing means within which the boom structure may be contained when in its stowed, compact condition. The housing means preferably includes drive means for effecting movement of the boom from its stowed compact condition to its elongate extended condition. Conveniently, the housing means includes an elongate flexible member extending substantially coaxially with respect to the boom and movable in the direction of its length and each frame element includes pick up means located on or near the axis of the boom and arranged such that on movement of the flexible member respective pick up means are engaged one after another in sequence to move the associated frame elements along with the flexible member.

The housing means advantageously includes unlocking means for unlocking a locked pair of elongate members between neighbouring frame elements as the frame element nearer the housing means approaches a next stowed frame element, thereby releasing the other frame element for movement towards the first stowed frame element. Where the locking means comprise an over-centre spring arrangement, the means may comprise a plurality of cam elements one associated with each longeron means respectively which are operable to engage each pair of elongate members to overcome the biass of the respective over-centre spring arrangements to effect hinging of the members.

By way of example only, one specific embodiment of extendable structure constructed in accordance with this invention will now be described in detail, reference being made to the accompanying drawings, in which.

Figure 1:
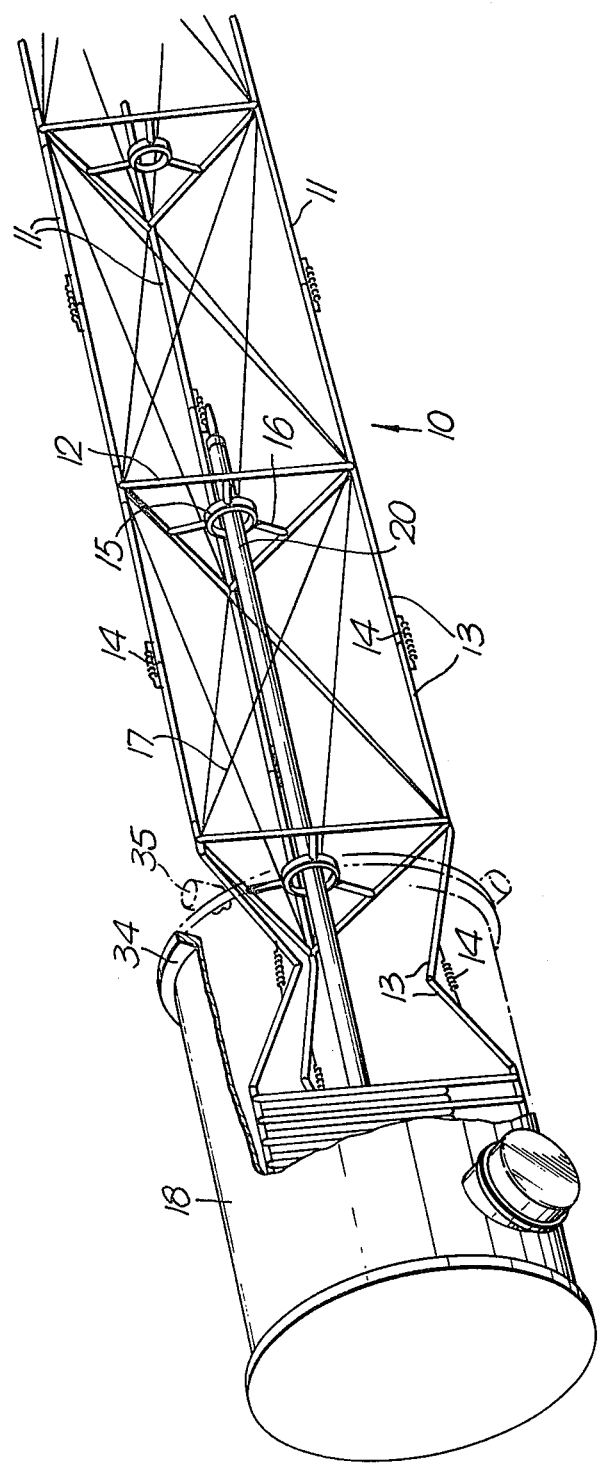
FIG. 1 is a perspective view, with certain parts cut away for clarity, of part of an open frame, extendable boom structure in a partially extended condition.

Referring to the drawings, there is shown a form of open-frame boom structure 10 which is movable between a collapsed, stowed, condition and an elongated, deployed condition. In FIG. 1, the part of the structure 10 on the left-hand side of the Figure is in a stowed condition, whilst the part of the structure on the right-hand side is in a deployed condition.

The structure 10 in its extended condition comprises three longerons 11 extending parallel to but spaced from one another to define three planes A, B and C.

A series of rigid equilateral triangular open frame elements 12 are located at intervals along the extension axis D of structure 10 with their respective apices attached to respective longerons. The frame elements are parallel to one another and transverse to the length of the structure.

Each longeron 11 is defined by a series of elongate rod members 13 which when the structure is in its extended condition extend end to end along the length of the structure 10, there being a pair of rod members 13 between each adjacent pair of frame elements. Each rod member 13 is hingedly attached at one end to an apex of a frame element and at its other end to another rod member 13.

Figure 2:
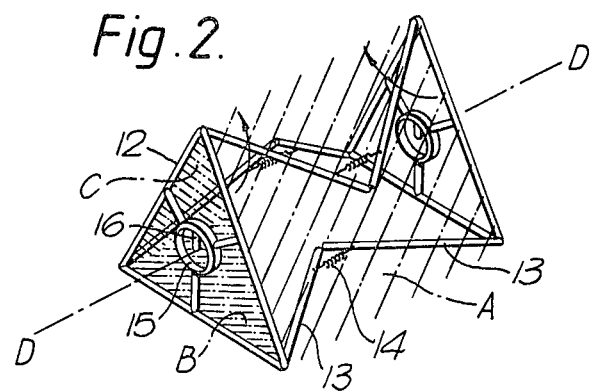
FIG. 2 is a view of two neighbouring frame members intermediate a stowed condition and an extended condition.

The hinges are arranged so that each pair of rod members is constrained hingedly to move in one of the planes A, B or C, as shown in FIG. 2; the other two pairs of rod members are constrained to move in respective other of the planes A, B or C.

This arrangement means that during extension or stowage of the structure none of the rod members 13 protrude significantly into the central space bounded by planes A, B and C. Also, the bending planes of the rod members 13 are spaced away from the natural bending axis D of the structure. This reduces the possibility of a bending load on the structure causing the rod members to hinge together and leading to collapse of the structure.

Figure 3:
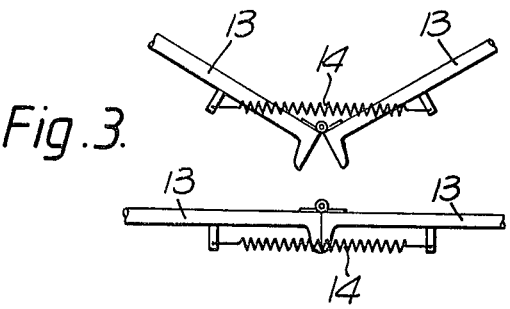
FIG. 3 is a detailed view of the locking means of the structure of FIGS. 1 and 2, and FIGS. 4 and 5 are detailed section views of the drive mechanism shown in FIG. 1.

Each pair of rod members 13 is capable of movement between a folded configuration, in which the two members lie side-by-side and parallel and an open bracing configuration in which they are straight. Each pair of members 13 includes an over-centre spring 14 arranged therebetween to provide a locking arrangement 14' releasably to lock the members in a straight condition (FIG. 3).

Each frame element 12 includes pick up means in the form of a drive collar 15, arranged concentrically with the extension axis D of the structure and having drive engagement lugs 16 to one side thereof. Tension wires 17 are provided between the non-aligned apices of neighbouring frame elements 11.

At the left-hand end of the structure 10, as viewed in FIG. 1, there is provided a generally cylindrical housing 18 which may receive the whole of structure 10 when it is in a stowed condition. The housing 18 also includes drive means 19 to effect deployment and stowage of the structure 10. The drive means 20 is of similar form to that described in our published application No. 2,074,981A and reference is directed to that application for a full description of the mechanism.

The drive means 19 basically comprises a pillar 20 extending away from the closed end of housing 18 and along the extension axis D of the structure 10, through all of the drive collars 15 (when the structure 10 is in its stowed, collapsed, condition). The pillar 20 includes a slot 21 wherein there is rotatably mounted a sprocket wheel 22. Near the rear end of the pillar 20, there is a further slot 23 which houses a pair of further sprocket wheels 24, 25, and which extends back and merges with a hole 26 formed in the base of the pillar 20.

Figure 5:
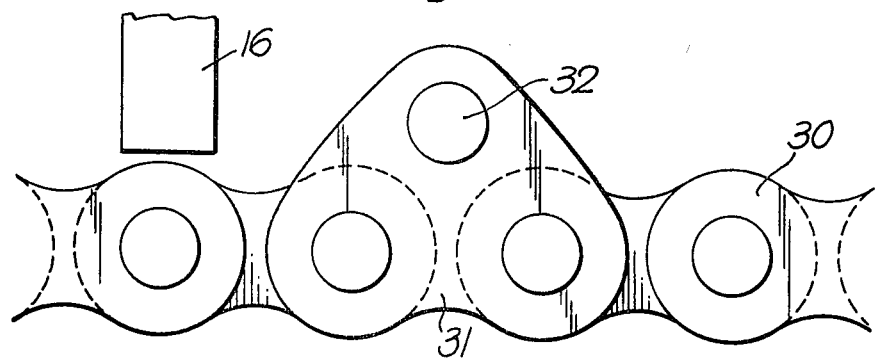

Arranged rearwardly of the base of the pillar 20 is a box 22 housing a drive mechanism 28 which includes a continuous sprocket chain loop 29. The sprocket chain 29 extends from box 27 around sprocket wheel 22 and further sprocket wheels 24, 25, thence back into box 27. Sprocket wheel 22 and sprocket wheel 24 define the operating portion of the path of the chain loop 29, whilst sprocket wheel 25 draws the chain away from the path to be contained within the profile of pillar 20. The drive mechanism 28 also includes a tensioning mechanism 30 to maintain the sprocket chain loop 30 under a degree of tension. For clarity, in FIG. 4, all the sprocket wheels are shown diagrammatically as smooth discs, while the sprocket chain loop 29 is drawn as a single line. The sprocket wheels are however of conventional form, and the sprocket chain 29 is also of generally conventional form but modified as to be explained with reference to FIG. 5.

The sprocket chain 29 is of conventional form except that, at spaced apart locations along its length, there is provided one or more carrier links 31 which have portions 32 extending transversely of the remainder of the sprocket chain loop 29. These portions 32 are adapted successively to engage the drive engagement lugs 16 provided on each of the frame elements 12, to move each frame element in turn from a stowed position, within the housing, to an extended position.

The housing 18 also includes an unlocking mechanism operable to effect unlocking of the rod elements 13 of each longeron from a straight condition between successive frame elements 12 when it is wished to move the structure 10 from an extended condition to a stowed condition. The unlocking mechanism comprises an annular ring 34 mounted for turning movement about the open end of the housing 18 and provided with three unlocking rollers 35 equispaced about the annular ring and mounted for rotation with respect to the annular ring about three generally radial axes. The unlocking rollers 35 are biassed in a tangential direction with respect to ring 34 and are positioned such that when the unlocking mechanism is operated, each unlocking roller 35 bears on one of the longerons 11 interconnecting a pair of neighbouring frame element 12. As the structure 10 is retracted, the rollers 35 act to overcome the locking biass of the over-centre spring arrangement 14 and thus to allow the rod members 13 to be folded.

The movement of the extendable structure 10 from a stowed condition to an extended condition and back to a stowed condition will now be described. In the stowed condition, the frame elements 12 are all contained within the housing 18, with their edges aligned and nested together as shown in the left-hand side of FIG. 1. The outermost frame element is positioned adjacent sprocket wheel 24, ready for engagement by the sprocket chain loop 29. The drive mechanism 28 is then actuated and chain loop 29 moves in the anti-clockwise sense as viewed in FIG. 4. When the, or one of the, carrier links 31 passes through drive collar 15, the drive engagement lugs 16 provided thereon are engaged by the carrier link 31 thereby to draw the outermost frame member towards its extended position. As this frame member approaches its extended position, the over-centre spring arrangements 14 will cause each pair of rod elements 13 to "flip" to the over-centre straight condition.

The outermost frame element is then in a rigid relationship with the next outermost frame element. The drive mechanism 28 continutes to draw the outermost frame element further out until it is released adjacent sprocket wheel 22. As this occurs, the next outermost frame element is drawn away from the remaining nested frame elements so that that element is positioned adjacent the sprocket wheel 24, ready for engagement by the, or the next, carrier link 31.

This cycle is repeated until the whole of the structure 10 has been extended. The housing 18 may then, if wished, be removed from the structure leaving the structure standing alone. Another structure in a stowed condition may then be inserted into the housing for deployment. Alternatively, a plurality of collapsed, stowed structures may be stacked one behind the other in the housing for subsequent deployment.

When it is wished to move an elongated, extended structure 10 to a stowed condition, the housing 18 is attached to an end of the extended structure 10 and the structure is prevented from rotating with respect to the housing. The annular ring 34 is then rotated so that the unlocking rollers 35 bear on the longerons between the innermost pair of elements. The drive mechanism 28 is then operated in the reverse sense to stow the innermost pair of frame elements 12 by moving the next-to-innermost frame element from a position adjacent the sprocket wheel 22 to a position adjacent the sprocket wheel 24. As this occurs, the three pairs of rod members 13 are drawn past the unlocking rollers 35, and the unlocking bias causes each pair to unlock and partially to fold. When the next-to-innermost frame element 12 has been drawn adjacent sprocket wheel 24, the next frame element 12 in the series is ready for pick-up adjacent sprocket wheel 22. The cycle is repeated until all the frame elements 12 have been stowed.

The pairs of rod members 13 may be folded together completely either by the action of the over-centre spring arrangement, or by the effect of subsequent frame elements 12 being drawn back into the housing 18.

It will be understood that the embodiment of extendable structure just described may provide an excellent basis for truss type structures since it is light, stiff, compact when folded and relatively impervious to the bending effects of non-uniform solar radiation.

The above described embodiment utilises a non-rotational deployment scheme and the deployment/stowage mechanism may be completely removed from the extended or stowed structure, thus enabling a single drive system to produce numerous truss elements for fabrication into a large unit (or retraction back to the stowed, original, state).

Whilst a form of drive mechanism similar to that described in our published application No. 2,074,981A has been found to be particularly suitable for effecting deployment and stowage of the structure of this invention, it will of course be appreciated that other forms of drive mechanism may be used without departing from the present invention.

Whilst the above described embodiment is particularly appropriate for use in space applications, it may find applications elsewhere, such as, for example, forming the basis for a transportable antenna tower, or constituting an erection device for temporary structures.

I claim:

1. An open-frame boom structure movable along a longitudinal axis between a stowed, compact condition and an elongate, extended condition, including
   (i) a plurality of rigid polygonal frame members arranged in longitudinal registration, each frame member including at least three side elements, connected end to end to define three corners;
   (ii) at least three longeron elements, each connecting respective aligned corners of said frame members, the portion of each longeron element between adjacent frame members being defined by a pair of elongate elements each pivotally attached at one end to a respective corner and at the other end to the elongate element of said pair, for folding movement wholly in the plane defined by a side element adjacent a said corner and the corresponding side element of the adjacent frame member without protruding out of said plane, between a folded position in which said elongate elements lie in side-by-side relationship between the corresponding side elements and an unfolded position in which said elongate elements lie in co-linear relationship substantially normal to said side elements, each pair of elongate elements between adjacent frame members being foldable in an individual plane, and each pair being arranged so that when in the folded position, said elongate elements do not protrude beyond said corresponding side elements, and
   (iii) locking means adapted releasably to lock each pair of elongate elements in its unfolded position, whereby the boom structure may be moved from its stowed condition to its elongate condition without rotation, by unfolding of said elongate elements, to provide a lightweight, stiff elongate structure.

2. A boom structure according to claim 1, wherein the frame elements are of triangular form and the longeron means are attached to the apex regions thereof.

3. A boom structure according to claim 2, wherein the frame elements are of equilateral triangular form.

4. A boom structure according to claim 3, wherein each of said elongate members is of substantially the same length as a side of the associated frame elements.

5. A boom structure according to any one of claims 1, 2, 3 or 4, wherein the locking means comprise an over-centre spring arrangement.

6. A boom structure according to claim 1, and further including housing means within which the boom structure may be contained when in its stowed, compact condition.

7. A boom structure according to claim 6, wherein the housing means includes drive means for effecting movement of the boom from its stowed compact condition to its elongate extended condition.

8. A boom structure according to claim 7, wherein the housing means includes an elongate flexible member extending substantaially coaxially with respect to the boom and movable in the direction of its length and each frame element includes pick up means located on or near the axis of the boom and arranged such that on movement of the flexible member respective pick up means are engaged one after another in sequence to move the associated frame elements along with the flexible member.

9. A boom structure according to any one of claims 6 to 8, wherein the housing means includes unlocking means for unlocking a locked pair of elongate members between neighbouring frame elements as the frame element nearer the housing means approaches a next stowed frame element, thereby releasing the other frame element for movement towards the first stowed frame element.

10. A boom structure according to claim 9, wherein the locking means comprise an over-centre spring arrangement and the unlocking means comprise a plurality of cam elements one assocaited with each longeron means respectively and operable to engage each pair of elongate members to overcome the biass of the respective over-centre spring arrangements to effect hinging of the elements.

11. In a spacecraft, a lightweight deployable open-frame boom system comprising an open-frame boom structure movable between a stowed compact condition and an elongate extended condition, said boom structure comprising:
   a plurality of rigid polygonal frame members arranged in longitudinal registration, each frame member including at least three side elements connected end to end to define three corners;
   at least three longeron elements, each connecting aligned corners of said frame members, the portion of each longeron element between adjacent frame members being defined by a pair of elongate elements, each pivotally attached at one end to a respective corner and at the other end to the other elongate member of said pair, for folding movement wholly in the plane defined by a side element adjacent said corner region and the corresponding side element of the adjacent frame member between a folded position in which said elongate elements lie in a side-by-side relationship between the corresponding side elements without protruding beyond said polygonal frame members and an unfolded position in which said elongate elements lie in colinear relationship substantially normal to said side elements, each pair of elongate elements between adjacent frame members being foldable in an individual plane, and each pair being arranged so that when in the folded position, the elongate elements do not protrude beyond said corresponding side elements, and
   locking means in the form of an over-centre spring arrangement associated with each pair of elongate elements adapted releasably to lock said elements in their unfolded position, said system further including housing means for receiving said boom structure when in its stowed condition, and drive means in the form of an elongate flexible member extending substantially co-axially with respect to said boom structure arranged to pick up successive frame elements one after the other and to move them out of the housing, so as to move the associated pairs of elongate elements from their folded to their unfolded condition, thereby to define a stiff elongate structure.

* * * * *